United States Patent Office 2,739,075
Patented Mar. 20, 1956

2,739,075
PRODUCT AND PROCESS

Ralph K. Iler, Wilmington, Del., assignor to E. I. du Pont de Nemours and Company, Wilmington, Del., a corporation of Delaware No Drawing. Application March 6, 1952,
Serial No. 275,233

9 Claims. (Cl. 106—308)

This invention relates to surface-modified siliceous solids and to their preparation. The invention is more particularly directed to inorganic siliceous particles having an average specific surface area of at least 1 square meter per gram, having chemically bound to the silicon atoms on the surface of said particles at least 100 —OR groups per 100 square millimicrons of surface area of the siliceous solid, where R is a substituted hydrocarbon radical having from 2 to 18 carbon atoms and in which the carbon attached to oxygen is also attached to at least one hydrogen atom, said radical containing a basic substituent attached to a carbon atom at least 1 carbon atom removed from the oxygen atom of the —OR group, the basic substituent being selected from the class consisting of nitrogen and sulfur atoms capable of forming onium ions.

According to the present invention siliceous solids having basic reacting surfaces can be prepared by chemically reacting substrate particles of inorganic siliceous material having an average specific surface area of at least 1 square meter per gram with a substituted primary or secondary alcohol containing amino nitrogen or sulfonium sulfur and having from 2 to 18 carbon atoms, the nitrogen or sulfur substituent being attached to a carbon atom at least 1 carbon atom removed from the hydroxyl group.

The products of the invention are a specific kind of siliceous solids which find particular use as adsorbants for acidic materials. Some of these solids are often called herein "estersils." Estersils are solids made by chemically reacting alcohols with certain supercolloidal siliceous solids. The reaction I have called esterification and the chemically bound —OR groups containing a basic reacting substituent resulting from the esterification I have called substituted ester groups.

For a detailed description of estersils prepared from primary and secondary unsubstituted monohydric alcohols, reference is made to my copending U. S. application Serial No. 171,759, filed July 1, 1950 now abandoned, or to Iler U. S. Patent 2,657,149, issued October 27, 1953, as a continuation in part of said application Serial No. 171,759, in which estersils of that class are claimed.

THE SUBSTRATE

The materials used to form the skeleton or internal structure, the so-called substrate, of the products of my invention are solid inorganic siliceous materials. They contain substantially no chemically bound organic groups. They have reactive surfaces which I believe to result from surface silanol (—SiOH) groups. The substrate materials can be mineral or synthetic in origin. They can be amorphous silica. They can be water-insoluble metal silicates. They can be water-insoluble metal silicates coated with amorphous silica.

For the purposes of this invention the substrate particles should have an average diameter greater than about 1 millimicron. Substrate particles in which the ultimate units have diameters of at least 5 millimicrons but less than 100 millimicrons are preferred. Another preferred type of substrate particles are supercolloidal aggregates or pulverulent solids.

It is further preferred that the inorganic siliceous solids be porous, that is, they should have exposed surfaces in the interior of the particle which are available to the exterior so that liquids and gases can penetrate the pores and reach the exposed surfaces of the pore walls. In other words, the solid forms a three-dimensional network or webwork through which the pores or voids or interstices extend as a labyrinth of passages or open spaces.

Especially preferred are porous inorganic siliceous solids having average pore diameter of at least four millimicrons. The large pores afford easy access for alcohol molecules in the subsequent esterification to give the products of the invention.

The substrate particles have large surface areas in relation to their mass. The term used herein and the one normally so used in the art to express the relationship of surface area to mass is "specific surface area." Numerically, specific surface area will be expressed in square meters per gram (m.$^2$/g.).

According to the present invention, the substrate particles have an average specific surface area of at least 1 square meter per gram and preferably the average specific surface area is at least 25 m.$^2$/g. In the case of precipitated amorphous silica, a preferred material, there is an optimum range of about 200 to 400 m.$^2$/g., based on the fact that in this range the supercolloidal particles or aggregates can be obtained in a dry state without bringing about a considerable collapse of the porous structure by replacing the water with a water-miscible organic solvent such as acetone and then drying. This powder is especially suitable for subsequent esterification. It is, of course, possible to produce very voluminous aerogels by processes of the prior art, having surface areas of from 200 to 900 m.$^2$/g. Such highly porous forms of silica can be surface-esterified by the process of this invention.

Specific surface area, as referred to herein, is determined by the accepted nitrogen adsorption method described in an article "A new method for measuring the surface areas of finely divided materials and for determining the size of particles" by P. H. Emmett in Symposium on New Methods for Particle Size Determination in Sub-Sieve Range published by the American Society For Testing Materials, March, 1951, page 95. The value of 0.162 square millimicron for the area covered by one surface adsorbed nitrogen molecule is used in calculating the specific surface areas.

Pore diameter values are obtained by first determining pore volume from nitrogen adsorption isotherms as described by Holmes and Emmett in Journal of Physical and Colloid Chemistry 51, 1262 (1947). From the volume figure, the diameters are obtained by simple geometry assuming cylindrical pore structure.

Determination of gross particle size and shape of substrate material are suitably made by a number of standard methods whose choice for use in a particular case depends upon the approximate size and shape of the particles and the degree of accuracy desired. Thus, for coarse materials, the dimensions of individual particles or coherent aggregates can be determined with the unaided eye and ruler or calipers. For more finely powdered material, the light microscope is used with a calibrated scale. For materials having a particle size in the range of from 2 or 3 microns down to 5 millimicrons, the electron microscope is used. Particle size determination using an electron microscope is described in detail by J. H. L. Watson in Analytical Chemistry 20, 576 (1948).

While various inorganic siliceous solids having the aforementioned properties can be used as substrate materials in preparation of the products of my invention, precipitated amorphous silica is particularly preferred. Such silica is characterized by X-rays as lacking crystalline structure.

The preparation of several suitable amorphous silicas is illustrated in the examples. For a detailed discussion of sources of amorphous silica for use in preparing estersils of primary and secondary alcohols, reference should be had to my copending U. S. application, Serial No. 171,759, filed July 1, 1950, now abandoned.

Instead of silica, water-insoluble metal silicates can be used as the substrate. Such metal silicates can be prepared, as is well known in the prior art, by treatment of silicas with metal salts or hydrous metal oxides, excluding those containing only alkali metal ions. Such metal silicates can be prepared so as to have a large number of silanol (—SiOH) groups on the surface of the particle. Thus metal silicates having a large proportion of metal ions on the surface may be activated for esterification by washing with acids to remove at least a portion of the metal ion and leave surface silanol groups.

Crystalline metal silicates occurring in nature can also be used. However, the proportion of silanol groups on most minerals is very small since the surfaces also contain metal hydroxy groups, silicon oxygen groups and adsorbed metal ions. Therefore, before esterification it is necessary to introduce silanol groups on the surface. Loosely adsorbed metal ions may be exchanged for hydrogen ions by washing the dilute acids or by treatment with ion exchange resins. In some cases, more vigorous treatment, such as reaction with acids at low pH and often at elevated temperatures are required to give a material which will contain a sufficient number of silanol groups in the surface to yield an organo-philic product on esterification.

Alternatively or additionally, silanol groups can be introduced on the surface of metal silicates by coating them with a layer of amorphous silica. This is accomplished by treating, say, sodium silicate with an acid in the presence of the mineral silicate particles under such conditions that the silica formed will deposit as a coating on the mineral particle.

Mineral crystalline silicates which can be used in preparing the substrate particles are as follows: the asbestos minerals, such as chrysotile asbestos and serpentine (hydrous magnesium silicate) and amphiboles such as crocidolite asbestos (a sodium magnesium iron silicate), amosite (an iron silicate), tremolite (a calcium magnesium silicate), and anthothyllite (a magnesium iron silicate); clay materials, such as halloysite (an aluminum silicate), attapulgite (a magnesium aluminum silicate), hectorite (a magnesium lithium silicate), nontronite (magnesium aluminum iron silicates); the kaolins, such as kaolinite, nacrite and dickite (aluminum silicate); and bentonites, such as beidillite, saponite and montmorillonite (magnesium aluminum iron silicates); and micaceous minerals, such as phlogopite (a potassium magnesium aluminum silicate), muscovite (a potassium aluminum silicate, biotite (a potassium iron aluminum silicate) and vermiculite (a hydrous magnesium iron aluminum silicate).

THE ESTERIFYING AGENT

The inorganic siliceous solids described above are reacted with substituted primary and secondary alcohols to give the products of the invention. The alcohols herein called esterifying agents are represented by the formula ROH where R is a substituted hydrocarbon radical in which the carbon atom attached to the oxygen of the hydroxyl group is also attached to at least one hydrogen, the hydrocarbon radical having from 2 to 18 carbon atoms and containing a basic substituent which is attached to a carbon atom at least 1 carbon atom removed from the hydroxyl group and which is capable of forming onium ions. The basic substituent is a member of the class consisting of amino nitrogen and sulfonium sulfur.

When it is said that the substituent is basic reacting, it is meant that the substituent is substantially basic in its chemical reactivity. When an alcohol containing a basic substituent is placed in water, its pH as measured by immersing a glass electrode in a 1% solution of the alcohol in water gives an apparent pH reading of at least 9 or higher. If the substituted alcohol is not readily soluble in water, it may be necessary to carry out the pH determination in the presence of a 50–50 mixture of water and methanol.

It will be understood that the basicity of the alcohol is due to the nitrogen and sulfur atoms which are capable of forming "onium" ions.

As examples of suitable "onium" forming, nitrogen-containing esterifying agents there may be named ethanolamine, diethanolamine, beta-diethylaminoethanol, 3-aminopropanol, para-aminobenzyl alcohol, 12-aminooctadecyl alcohol and alpha-methylbenzyldiethanolamines.

Suitable esterifying compounds containing a sulfur atom capable of forming sulfonium ions include gamma-hydroxypropyl methyl sulfide, bis-beta-hydroxyethyl sulfide, beta-hydroxyethyl methyl sulfide, beta-hydroxyethyl ethyl sulfide and beta-hydroxyethyl propyl sulfide. These sulfur-containing alcohols can be esterified with the silica surface and subsequently reacted with a compound such as, for example, methyl bromide to convert the sulfur atom to sulfonium ions.

Technically, there is no upper limit to the number of carbon atoms which may be present in the esterifying agent. As a practical matter, however, the group of alcohols having from 2 to 18 carbon atoms include the majority of the common alcohols and offer a selection of molecule sizes which should be adequate for any purpose.

Substituted alcohols containing from 3 to 8 carbon atoms are especially preferred because they are the most economical to use and yield a product having a low ratio of organic matter through silica.

Still more preferred are the amino alcohols. The amino alcohols may contain a primary, secondary or tertiary amino group.

The esterifying agent will ordinarily contain only one basic substituent, but the agent can contain more than one group. The groups do not necessarily need to be the same.

The esterifying agent need not be a single alcohol. Mixtures of substituted alcohols can be used. Thus, when a variety of surface properties is desired, a mixture of alcohols may be used. Also, there can be a mixture of different chain lengths found in the technical grade of some alcohols. And, if desired, a mixture consisting of an unsubstituted primary or secondary alcohol and an alcohol containing a basic substituent group can be used.

ESTERIFICATION

The siliceous substrate to be reacted with the alcohol containing the basic substituent group should contain surface silanol groups. Pure amorphous silica which has been in contact with moisture has such a surface. The surface must not be covered with other materials which block access to the silanol group. Metal ions on the surface of metal silicates must be exchanged for hydrogen atoms. This can be done by treatment with a hydrogen form of a cation exchange resin or by treatment with an acid as mentioned heretofore. Alternatively, the particles can be coated with a thin layer of silica. The external surface can then be reacted with alcohol.

The inorganic siliceous solid is preferably freed of extraneous material before esterification, and the pH is adjusted to avoid strong acids or alkalis in the reaction. The pH is preferably 5 to 8.

The amount of water present in the reacting mass during the esterification step has an important bearing on the degree of esterification that will be obtained. Thus, since the esterification process is an equilibrium reaction, it is ordinarily desirable to keep the water content as low as possible during the course of the reaction.

In order to esterify sufficiently to obtain a high proportion of substituted ester groups on the surface of the siliceous particles, the water in the liquid phase of the system should not exceed about 5% by weight of that phase. For maximum esterification, the water content must be kept below about 1.5%. As already mentioned, it is desirable to keep the water content as low as possible.

Because of the hindering effect of water on the esterification, if the siliceous solid to be esterified is wet, the free water must be removed either before the solid is put into the alcohol or alternatively it may be removed by distillation after mixing with the alcohol.

Simple air drying at temperatures of from 100 to 150° C. will remove most of the free water. Drying may be hastened by the application of vacuum. For many types of siliceous solids, however, air drying is not satisfactory because they tend to shrink to hard, compact masses upon drying from water.

Water can suitably be removed from a wet siliceous solid before esterification by displacing the water in the wet mass with a polar organic solvent such as acetone. The solvent can later be recovered.

Preferably, water is removed from wet siliceous solids prior to esterification by azeotropic distillation. Thus, water-wet cake can be mixed with a polar organic solvent such as methyl ethyl ketone and the mixture distilled until the system is freed from water. The organic solvent can then be evaporated to give a dry product for reaction with alcohol.

Alternatively, the alcohol which is to be used as the esterifying agent can also be used in some instances as the azeotropic dehydrating agent.

The ratio of alcohol and siliceous material to be used in the esterification is limited only by the fact that the alcohol should be present in sufficient excess to facilitate a practical rate of reaction. Preferably, sufficient alcohol is used to provide a slurry of the siliceous material in alcohol which can be readily stirred. Of course, larger portions of alcohol must be used when no water is removed from the system during the reaction. The reason for this being that the reaction liberates water and may exceed the maximum permissible value unless alcohol is added either before or during the reaction step.

In general, it is sufficient to carry out the esterification by simply refluxing the mixture of the silica and the alcohol together for a suitable length of time, for example, upwards of 2 hours. In cases where the alcohol is somewhat unstable, it may be desirable to carry out the esterification at somewhat lower temperatures than the boiling point of the alcohol in order to prevent the excessive decomposition in the liquid phase. A preferred method of using unstable alcohols as esterifying agents comprises "heat-activating" the silica and chemically reacting the alcohol with the resulting surface-activated silica in accordance with the invention described and claimed in the copending application of Max T. Goebel, Serial No. 261,140, filed December 11, 1951.

In addition, when the alcohol to be used is rather low boiling, that is, less than 100° C., in order to promote more complete reaction than could be realized at the boiling point, it may be desired to carry out the esterification in the autoclave at temperatures from 200–300° C.

The extent of the reaction is fixed more by the temperature than by the time, that is, at a suitable temperature the esterification reaction proceeds quite rapidly up to a certain point which is characteristic of the temperature and of the alcohol and thereafter proceeds slowly.

The minimum reaction time and temperature in order to obtain any given extent of reaction varies with the alcohol used. While it is difficult to set forth in great detail the relationship between the temperature required for any given extent of reaction and the structure of the alcohol, one skilled in the art may learn from the data the general principles involved and conclude what conditions should be used for another alcohol.

The temperatures substantially below about 100° C. are not suitable in most instances. Alcohol may be adsorbed on the siliceous surface at such temperatures but true esterification is not obtained.

The esterified temperature should not exceed the thermal decomposition point of the alcohol while in the presence of siliceous solids. Nor should it exceed the point of thermal stability of the esterified siliceous materials. Preferably, the heating is not prolonged any more than is required to achieve esterification equilibrium.

As already indicated, the reaction between amorphous silica and liquid alcohols can be carried out by autoclaving a slurry of the silica in an excess of the organic reagent. However, when the alcohol is high melting, or unstable above its melting point, it is preferred to carry out the reaction in a dilute solution, say, 10% of the organic reagent in an inert solvent, such as, for instance, benzene, toluene, xylene, trichloroethylene, dioxane and dibutyl ether of ethylene glycol.

Whether the reaction is effected at atmospheric pressure, at the reflux temperature of the solution or under autoclave conditions will largely depend on the boiling point of the solvent used; that is, whether the boiling point is high enough to effect substantial reaction between the silica and the esterifying agent. Occasionally, it is desirable to deposit a mono layer of the alcohol uniformly over the silica surface by stirring the latter with a solution of the alcohol in a low boiling, inert solvent such as ether or acetone, and then evaporating the solvent while maintaining constant agitation. Complete reaction is then effected by heating the dry, coated product to a temperature sufficiently high to cause removal of water.

After completion of the esterification, the product estersils can be removed from the unreacted alcohol by conventional methods. Thus, the separation can be made by filtration in those instances wherein the estersils consist of particles of supercolloidal size. These estersils are retained on ordinary filter media.

Alternatively, the alcohol can be vaporized by applying vacuum to the reaction vessel. Or where the alcohol is one which will distill at atmospheric pressure without decomposition, simple distillation can be used. In the case of higher alcohols which are not readily distilled, except under very high vacuum, the alcohol can be extracted from the product with a low boiling solvent such as, for instance, methyl ethyl ketone, chloroform or ether.

PROPERTIES AND USES OF THE PRODUCTS

The products of the invention are in the form of powders or sometimes lumps or cakes which are pulverable under the pressure of the finger or by a light rubbing action. The esterified inorganic siliceous solids are exceedingly fine, light, fluffy, voluminous powders.

The esterification reaction does not substantially change the structure of the inorganic siliceous solid or substrate which was esterified. In other words, the internal structure of the estersil, the structure to which the —OR groups are chemically bound, has substantially the same particle size, surface area and other characteristics described previously in the discussion of the substrate material. The estersils of the invention are in a colloidal or supercolloidal state of subdivision.

The products of the invention can be hydrophilic or organophilic depending on the particular alcohol employed as the esterifying agent and also on the type and number of basic substituents per —OR group. In general, the products will be hydrophilic due to the presence on their surfaces of the polar basic substituent group. If a long chain alcohol is employed, the resulting product may also be organophilic.

By the term "organophilic" I mean that when a pinch of estersil is shaken in a two-phase liquid system of water and n-butanol in a test tube the product will "wet" into the n-butanol phase in preference to the water phase.

The number of ester groups for 100 square millimicrons of siliceous substrate surface is calculated from the expression $$\text{Surface area} = \frac{6.02 \times 10^{23} \times C}{12n \times S_n \times 10^{18}} = \frac{50{,}200 \times C}{n \times S_n}$$

where $C$ is the weight of the carbon in grams attached to 100 grams of substrate; $n$ is the number of carbon atoms in the —OR groups; $S_n$ is the specific surface area in m.²/g. of the substrate as determined by nitrogen adsorption.

Where the sample to be analyzed is one in which the type of alcohol is unknown, the sample can be decomposed with an acid and the alcohol can be recovered and identified. The specific surface area of the substrate can be determined by first burning off the ester groups, as for example, by slowly heating the estersil in a stream of oxygen up to 500° C. and holding it at that temperature for a period of about three hours and then rehydrating the surface of the particles by exposure to 100% relative humidity at room temperature for several hours and finally determining the surface area of the remaining solid by nitrogen adsorption method.

In the products of the invention the —OR groups are chemically bound to the substrate. The products should not be confused with compositions in which an alcohol is merely physically adsorbed on the surface of the siliceous solid. Adsorbed alcohols can be removed by heating the material at relatively low temperature, for example, 150° C. under high vacuum, say, 10⁻⁵ millimeters of mercury for a period of one hour. In contrast, the products of my invention are stable under such treatment. Neither can the ester groups be removed by washing with hot methyl ethyl ketone or similar solvents or by prolonged extraction in a Soxhlet extractor. In case of ordinary physical adsorption the alcohol is displaced by such treatment.

When esterification is effected with an amino alcohol, the presence of the basic amino group in the product can be shown by the high pH of a slurry of the product in water. Thus, for instance, the pH of a 10% slurry is within the range of 9–10. Additionally or alternatively, the basic amine groups on the surface of the estersil may be titrated with standard acid.

It has already been observed that the products of the invention are absorbents for acidic materials. Using an acidic substance such as an acid dye, it can be further demonstrated that amine groups are present on the surface of esterified silica. By slurrying a product of the present invention for a brief period, say, five minutes, with a solution of an acid dye, collecting the product, washing it with water and ether and finally drying, a dyed product is obtained. Control samples of unesterified silicas and siliceous powders esterified with unsubstituted aliphatic alcohols are not dyed under identical conditions.

The products of the invention are useful as adsorbents for acidic substances, especially acid dyes, and as fillers for polymeric materials. The products find particular utility as fillers for polymeric substances where the polymer contains an acidic substituent. The latter may react with the basic substituent from the estersil surface to yield a chemically integrated structure. The products are also useful as fillers for elastomers such as, for instance, silicone rubber.

In order that the invention may be better understood reference should be had to the following illustrative examples:

Example 1

This is an example of a process of this invention wherein a siliceous powder consisting of coherent aggregates of coalesced, dense, ultimate units is esterfied with beta-diethylaminoethanol.

A silica sol was prepared in the following manner: A solution of sodium silicate, having an $SiO_2:Na_2O$ mole ratio of 3.36, and containing 3.64 grams of $SiO_2$ per 100 milliliters, was heated to 95° C. To ten volumes of this hot silicate solution 1 volume of a 2.9 N sulfuric acid solution was added over a period of one-half hour, at a uniform rate, and with vigorous agitation. The final $SiO_2$ concentration was 3.3% and 80% of the $Na_2O$ originally present in the sodium silicate solution was neutralized, i. e., the final $SO_3:Na_2O$ mole ratio was equal to 0.8. The $Na^+$ ion concentration was maintained at less than 0.4 N throughout the process and the final pH of the sol was about 10. In this manner an opalescent silica sol was prepared, the particles of which were about 15 millimicrons in diameter as determined from electron micrographs. Hereafter, a silica sol prepared in the above manner will be referred to as the "heel."

To a "heel" prepared in this manner equal volumes of sodium silicate solution ($SiO_2:Na_2O$ mole ratio=3.36) and a sulfuric acid solution were added simultaneously but separately with vigorous agitation over a two hour period, while the temperature was maintained at 95° C. The concentration of the sodium silicate solution was about 6.6 grams of $SiO_2$ per 100 milliliters and a sufficient volume was added over the two hour period so that two parts of $SiO_2$ were added for each part of $SiO_2$ originally present in the "heel." The concentration of $SiO_2$ in the silica sol or slurry was maintained at 3.3 grams of $SiO_2$ per 100 milliliters throughout the preparation. The concentration of the sulfuric acid (0.52 N) was adjusted so that at all times the ratio of $SO_3$ to $Na_2O$ in the solution was 0.8, i. e., a pH of about 10 was maintained. The $Na^+$ ion concentration was maintained at less than 0.4 N throughout the process.

Early in the "build-up" process the particles of silica present in the heel started to coalesce and precipitate. The final slurry was filtered, the wet filter cake was reslurried in water, and coagulated with 0.2% by weight (based on $SiO_2$) of a mixture of equi-molar portions of cetyl and lauryl trimethylammonium bromide. The pH was adjusted to about 8 with 4 molar sulfuric acid, the reslurry was filtered, washed, and the cake was dried and the soft, pulverable product was powdered in the Raymond mill.

The dried powder consists of coherent aggregates of coalesced, dense ultimate units having an average unit diameter of about 25 millimicrons. The specific surface as measured by nitrogen adsorption was 97 square meters per gram, and the specific hydroxylated surface area was 97 square meters per gram as measured by methyl red adsorption. A slurry of 4 grams of the silica in 40 cc. of distilled water had a pH of 8.2.

The dry silica powder prepared according to the above method was further dried in vacuum at a temperature of 70° C. Ninety-three parts by weight were then added to 500 parts by volume of beta-diethylaminoethanol. The resulting slurry was charged to a pot fitted for reflux, and the temperature of the slurry was slowly raised. The slurry formed a thick mixture, particularly around 60–70° C., which thinned out as the temperature increased to 100° C. and above. A little water was distilled off at 100° C., and the mixture started to boil at 154° C. The mixture was maintained at boiling point for a period of 1½ hours. The temperature of the mixture gradually rose to 160° C.

The slurry was allowed to cool. It was then filtered.

The filter-cake was collected, slurried with ethanol three times, collected and finally dried from a steam bath.

The resulting material was a white free-flowing powder, which was found to contain 1.51% carbon by chemical analysis. Based on the carbon analysis and the specific surface area, this corresponds to 130 substituted ester groups per 100 square millimicrons of silica surface.

When 4 grams of the final product were slurried in 40 milliliters of distilled water, the pH was found to be 9.6. This demonstrated the presence of the amine groups on the esterified surface.

Two-tenths parts by weight of the esterified silica was agitated for a period of 7 minutes at room temperature with an excess of a 0.1% aqueous solution of an acid dyestuff having Colour Index Number 278 (U. S. Patent 931,423) containing 0.1% $H_2SO_4$. At the end of the treatment time, the dye solution was removed by filtration, and the solid was washed on the filter paper with 50 parts by volume of ethyl ether, each in small portions. The resulting powder was dried and was found to be dyed a deep red color. In contrast, an unesterified control sample was treated in exactly the same manner, and was found to remain colorless.

Example 2

Twenty-five parts by weight of the dry silica powder, consisting of coherent aggregates of coalesced, dense, ultimate units, prepared as in Example 1, was heated in an excess of alpha-methylbenzyldiethanolamine to a temperature of 225° C., and finally allowed to cool. The silica was removed from the slurry by filtration and the resulting wet-cake was washed with ethanol by filtering three times. The filter cake was finally dried on a steam bath and then in an oven.

Two-tenths part by weight of the resulting dry estersil was treated at room temperature with 0.1% aqueous solution of a dyestuff having Colour Index No. 1078 (U. S. Patent 599,426), containing 0.1% sulfuric acid, by agitating the slurry for a period of seven minutes. The dye solution was removed by filtration and the solid material washed on the filter paper with 50 parts by volume of water, 25 parts by volume of ethanol and 5 parts by volume of ethyl ether, each in small portions. The resulting material was dried and was found to be dyed a bluish green. In contrast, an unesterified control was not dyed by a similar treatment.

Example 3

This is an example of the esterification of 17 millimicron, dense silica particles with ethanolamine.

Two hundred parts by volume of a commercially available 30% silica sol consisting of 17 millimicron colloidal particles and known as "Ludox" colloidal silica was deionized by successive passes through a bed of a cation and then an anion exchanger. The resulting sol was charged to a distilling vessel, fitted with a packed column, a stirrer, and a thermometer, 450 parts by volume of ethanolamine was added to the vessel.

The temperature of the mixture of sol and ethanolamine was gradually increased. Water was distilled from the mixture. At a temperature of 137° C. the material gelled quite suddenly, and distillation was stopped. The excess ethanolamine was removed under vacuum while the mixture was heated on a steam bath. The resulting solid was washed with ethanol by slurrying and filtering three times. The resulting material was dried on a steam bath.

The resulting dry powder was found to contain 1.99% carbon by chemical analysis. Based on the carbon analysis and a specific surface area of 175 m.²/g., this corresponds to a degree of esterification of about 285 substituted ester groups per 100 square millimicrons of silica surface.

Four grams of the dried sample was slurried in 40 ml. of distilled water to demonstrate the basic nature of the esterified surface. The resulting pH was found to be 9.0.

I claim:

1. A solid consisting essentially of substrate particles of inorganic siliceous material having an average specific surface area of from 1 to 900 square meters per gram, and an average particle diameter greater than about 1 millimicron, having chemically bound to the silicon atoms on the surface of said particles at least 100 —OR groups per 100 square millimicrons of surface area of the siliceous material, where R is a substituted hydrocarbon radical having from 2 to 18 carbon atoms and in which the carbon attached to oxygen is also attached to at least one hydrogen atom, said substituted hydrocarbon radical containing a basic substituent attached to a carbon atom at least 1 carbon atom removed from the oxygen atom of the —OR group, the substituent being selected from the class consisting of nitrogen and sulfur atoms capable of forming onium ions.

2. A solid consisting essentially of substrate particles of inorganic siliceous material having an average specific surface area of from 1 to 900 square meters per gram, and an average particle diameter greater than about 1 millimicron, having chemically bound to the silicon atoms on the surface of said particles at least 100 —OR groups per 100 square millimicrons of surface area of the siliceous material, where R is a substituted hydrocarbon radical having from 2 to 18 carbon atoms and in which the carbon attached to oxygen is also attached to at least one hydrogen atom, said substituted hydrocarbon radical containing a basic substituent attached to a carbon atom at least 1 carbon atom removed from the oxygen atom of the —OR group the basic substituent being selected from the class consisting of amino nitrogen and sulfonium sulfur.

3. A powder consisting essentially of substrate particles of amorphous silica in a supercolloidal state of subdivision having an average specific surface area of from 1 to 900 square meters per gram, and an average particle diameter greater than about 1 millimicron, having chemically bound to the silicon atoms on the surface of said particles at least 100 —OR groups per 100 square millimicrons of surface area of substrate surface, where R is a substituted hydrocarbon radical having from 2 to 18 carbon atoms and in which the carbon attached to oxygen is also attached to at least one hydrogen atom, said substituted hydrocarbon radical having a basic substituent attached to a carbon atom at least 1 carbon atom removed from the oxygen atom of the —OR group, the basic substituent being selected from the class consisting of amino nitrogen and sulfonium sulfur.

4. A powder consisting essentially of substrate particles of amorphous silica in a supercolloidal state of subdivision having an average specific surface area of from 1 to 900 square meters per gram, and an average particle diameter greater than about 1 millimicron, and having chemically bound to the silicon atoms on the surface of said particles at least 100 —OR groups per 100 square millimicrons of surface area of the siliceous material, where R is a substituted hydrocarbon radical having from 2 to 18 carbon atoms and in which the carbon attached to oxygen is also attached to at least one hydrogen atom, said substituted hydrocarbon radical containing a basic nitrogen substituent capable of forming onium ions attached to a carbon atom at least 1 carbon atom removed from the oxygen atom of the —OR group.

5. A powder consisting essentially of substrate particles of amorphous silica in a supercolloidal state of subdivision having an average specific surface area of from 200 to 900 square meters per gram, and an average particle diameter greater than about 1 millimicron, having an average pore diameter of at least 4 millimicrons, and having chemically bound to the silicon atoms on the surface of said particles at least 100 —OR groups per 100 square millimicrons of surface area of the siliceous material, where R is a substituted hydrocarbon radical having from 2 to 18 carbon atoms and in which the carbon attached to oxygen is also attached to at least one hydrogen atom, said substituted hydrocarbon radical containing a basic nitrogen substituent attached to a carbon atom at least 1 carbon atom removed from the oxygen atom of the —OR group.

6. A process which comprises the step of chemically reacting an alcohol of the formula ROH in which R is a substituted hydrocarbon radical having from 2 to 18 carbon atoms, wherein the carbon atom attached to oxygen is also atatched to at least one hydrogen, said radical containing a basic substituent attached to a carbon atom at least 1 carbon atom removed from the hydroxyl group, the substituent being selected from the class consisting of nitrogen and sulfur atoms capable of forming onium ions, with an inorganic siliceous material which is substantially free of strong acids and alkalis and has an average specific surface area of from 1 to 900 square meters per gram and an average particle diameter greater than about 1 millimicron, and a reactive surface containing groups selected from the class consisting of silanol and heat-activated silicon-oxygen groups, while maintaining the water content of the system below about 5 per cent by weight of the alcohol in the system and the temperature in the range from 100° C. to the thermal decomposition temperature of the alcohol.

7. A process which comprises the step of chemically reacting at a pH of 5 to 8, an alcohol of the formula ROH in which R is a substituted hydrocarbon radical having from 2 to 18 carbon atoms, wherein the carbon atom attached to oxygen is also attached to at least one hydrogen, said radical containing a basic substituent attached to a carbon atom at least 1 carbon atom removed from the hydroxyl group, the substituent being selected from the class consisting of amino nitrogen and sulfonium sulfur with an inorganic siliceous material having an average specific surface area of from 1 to 900 square meters per gram and an average particle diameter greater than about 1 millimicron, and having a reactive surface containing groups selected from the class consisting of silanol and heat-activated silicon-oxygen groups, while maintaining the water content of the system below about 5 per cent by weight of the alcohol in the system and the temperature in the range from 100° C. to the thermal decomposition temperature of the alcohol.

8. A process which comprises the step of chemically reacting at a pH of 5 to 8, an alcohol of the formula ROH in which R is a substituted hydrocarbon radical having from 2 to 18 carbon atoms, wherein the carbon atom attached to oxygen is also attached to at least one hydrogen, said radical containing an amino nitrogen attached to a carbon atom at least 1 carbon atom removed from the hydroxyl group, with an inorganic siliceous material in a supercolloidal state of subdivision, having an average specific surface area of from 1 to 900 square meters per gram, and an average particle diameter greater than about 1 millimicron, and having a reactive surface containing groups selected from the class consisting of silanol and heat-activated silicon-oxygen groups, while maintaining the water content of the system below about 5 per cent by weight of the alcohol in the system and the temperature in the range from 100° C. to the thermal decomposition temperature of the alcohol.

9. A process which comprises the step of chemically reacting at a pH of 5 to 8, an alcohol of the formula ROH in which R is a substituted hydrocarbon radical having from 2 to 18 carbon atoms, wherein the carbon atom attached to oxygen is also attached to at least one hydrogen, said radical containing a basic substituent attached to a carbon atom at least 1 carbon atom removed from the hydroxyl group, the substituent containing amino nitrogen, with an inorganic siliceous material in a supercolloidal state of subdivision, having an average specific surface area of from 1 to 900 square meters per gram, and an average particle diameter greater than about 1 millimicron, and having a reactive surface containing groups selected from the class consisting of silanol and heat-activated silicon-oxygen groups, while maintaining the water content of the system under about 5% by weight of alcohol in the system and the temperature in the range from 100° C. to the thermal decomposition temperature of the alcohol until at least 100 —OR groups per 100 square millimicrons of surface area of said inorganic siliceous solids are chemically bound thereto.

References Cited in the file of this patent

UNITED STATES PATENTS

| | | |
|---|---|---|
| 1,594,627 | Meyers | Aug. 3, 1926 |
| 1,868,422 | Luecke | July 19, 1932 |
| 2,251,496 | Parsons | Aug. 5, 1941 |
| 2,325,217 | Beers | July 27, 1943 |